United States Patent
Schipperges et al.

(10) Patent No.: US 10,938,233 B2
(45) Date of Patent: Mar. 2, 2021

(54) BATTERY STORAGE SYSTEM AND ON-BOARD ELECTRICAL SYSTEM FOR SUPPLYING POWER IN A FAULT-TOLERANT MANNER TO SAFETY-RELEVANT LOADS IN A VEHICLE

(71) Applicant: Dr. Ing. h.c. F. Porsche Aktiengesellschaft, Stuttgart (DE)

(72) Inventors: Fabian Schipperges, Ettlingen (DE); Tihomir Tomanic, Pfinztal (DE); Christoph Kukral, Leonberg (DE); Dennis Berger, Bietigheim-Bissingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 340 days.

(21) Appl. No.: 15/899,425

(22) Filed: Feb. 20, 2018

(65) Prior Publication Data
US 2018/0262044 A1 Sep. 13, 2018

(30) Foreign Application Priority Data
Mar. 9, 2017 (DE) ........................ 10 2017 104 958

(51) Int. Cl.
*H02J 7/00* (2006.01)
*H02J 7/14* (2006.01)
(Continued)

(52) U.S. Cl.
CPC .......... *H02J 7/1461* (2013.01); *B60R 16/033* (2013.01); *H02J 1/08* (2013.01);
(Continued)

(58) Field of Classification Search
CPC ........ H02J 7/0063; H02J 7/0025; H02J 7/007; H02J 7/0013
(Continued)

(56) References Cited

U.S. PATENT DOCUMENTS 5,488,283 A * 1/1996 Dougherty ........ H01M 10/0413
307/10.1
5,764,032 A * 6/1998 Moore .................. H02J 7/0024
307/66
(Continued)

FOREIGN PATENT DOCUMENTS

DE 19734598 C1 2/1999
DE 19755050 A1 7/1999
(Continued)

*Primary Examiner* — Adi Amrany
(74) *Attorney, Agent, or Firm* — Leydig, Voit & Mayer, Ltd.

(57) ABSTRACT

A battery storage system, for supplying electrical power to at least one electrical vehicle function, which is redundantly connected to the battery storage system by a first supply branch and a second supply branch includes a first connection and a second connection configured to connect to the first and the second supply branches; at least one ground connection; a connection line, which connects the first and the second connections; a cross-isolating switching apparatus arranged in the connection line and configured to interrupt the connection line; a first energy storage unit connected to the connection line between the first connection and the cross-isolating switching apparatus; and a second energy storage unit connected to the connection line between the second connection and the cross-isolating switching apparatus.

20 Claims, 3 Drawing Sheets

(51) Int. Cl.
*B60R 16/033* (2006.01)
*H02J 3/14* (2006.01)
*H02J 1/08* (2006.01)
*H02J 13/00* (2006.01)
*H02J 1/10* (2006.01)
*H02J 9/06* (2006.01)

(52) U.S. Cl.
CPC .................. *H02J 1/10* (2013.01); *H02J 3/14* (2013.01); *H02J 7/0063* (2013.01); *H02J 7/1423* (2013.01); *H02J 9/06* (2013.01); *H02J 13/0003* (2013.01); *H02J 7/007* (2013.01); *H02J 7/0013* (2013.01); *H02J 7/0025* (2020.01); *Y02T 10/70* (2013.01); *Y02T 90/167* (2013.01); *Y04S 30/12* (2013.01); *Y04S 30/14* (2013.01)

(58) Field of Classification Search
USPC .............................................. 307/64–66, 9.1
See application file for complete search history.

(56) References Cited

U.S. PATENT DOCUMENTS

| | | | | |
|---|---|---|---|---|
| 6,040,561 A * | 3/2000 | Murty | .................. | B60L 3/0069 219/494 |
| 6,088,638 A | 7/2000 | Behrends et al. | | |
| 7,336,002 B2 * | 2/2008 | Kato | .................... | H02J 7/1423 307/10.6 |
| 7,389,837 B2 * | 6/2008 | Tamai | ....................... | B60L 1/00 180/65.29 |
| 8,749,193 B1 * | 6/2014 | Sullivan | ................ | H02J 7/1461 320/104 |
| 9,821,738 B2 * | 11/2017 | Joao | ................... | H02J 7/1423 |
| 10,044,182 B2 * | 8/2018 | Takahashi | ............... | H02J 7/007 |
| 2004/0192407 A1 * | 9/2004 | Formenti | .............. | H02J 7/0013 455/572 |
| 2006/0006840 A1 * | 1/2006 | Furukawa | ............... | B60L 58/15 320/116 |
| 2008/0006491 A1 | 1/2008 | Degoul et al. | | |
| 2011/0254654 A1 * | 10/2011 | Lo | ........................... | B60R 25/04 340/3.1 |
| 2012/0074894 A1 * | 3/2012 | Chen | ..................... | H01M 16/00 320/103 |
| 2013/0082639 A1 | 4/2013 | O'Kane et al. | | |
| 2016/0089992 A1 * | 3/2016 | Le | ....................... | H02J 7/00047 320/107 |
| 2017/0012324 A1 * | 1/2017 | Giordano | ............ | H01M 10/613 |
| 2017/0256982 A1 * | 9/2017 | Kumar K N | ......... | H02J 7/0063 |
| 2018/0001850 A1 * | 1/2018 | Kontani | ................ | H02J 7/1423 |
| 2018/0354436 A1 * | 12/2018 | Sato | ..................... | H02H 7/1203 |

FOREIGN PATENT DOCUMENTS

| | | |
|---|---|---|
| DE | 102005004330 A1 | 8/2006 |
| DE | 102006032279 A1 | 1/2008 |
| DE | 102012216087 A1 | 4/2013 |
| DE | 102013221578 A1 | 4/2015 |
| DE | 102013225020 A1 | 6/2015 |

* cited by examiner

BATTERY STORAGE SYSTEM AND ON-BOARD ELECTRICAL SYSTEM FOR SUPPLYING POWER IN A FAULT-TOLERANT MANNER TO SAFETY-RELEVANT LOADS IN A VEHICLE

CROSS REFERENCE TO RELATED APPLICATIONS

This application claims benefit to German Patent Application No. DE 10 2017 104 958.4, filed Mar. 9, 2017, which is hereby incorporated by reference herein.

FIELD

The present invention relates to a battery storage system, in particular for a vehicle, for supplying electrical power to at least one electrical vehicle function, which is redundantly connected to the battery storage system. The invention relates furthermore to an on-board electrical system, in particular for a vehicle, for supplying electrical power to at least one electrical vehicle function, which is redundantly connected to the battery storage system. The invention also relates to a vehicle having an abovementioned on-board electrical system.

BACKGROUND

In current vehicles, vehicle functions are increasingly being controlled electrically. In principle, this basically relates to various fields, from engine control by means of pedal control for gas and brakes or transmission of a steering movement up to the air-conditioning system of the vehicle or other systems.

Electrical systems of this kind are supplied with electrical energy by means of an on-board electrical system. The on-board electrical system typically has a voltage of 12 V, wherein on-board electrical systems or at least subnetworks with 24 V, 48 V or even higher are also increasingly being used. Several hundred volts are typically supplied for electric drives.

On account of the increasing integration of assistance systems in vehicles permitting ranges of functions up to automated driving, the on-board electrical system has to meet appropriate safety conditions in order to ensure safety when driving. It is generally known in this case to supply power to safety-relevant electrical vehicle functions such as an electrical steering system, an electrical brake or at least a part of a sensor system of the vehicle by means of a redundant on-board electrical system in order to provide increased availability even in the event of a fault in the on-board power supply system. The safety-relevant systems are thus connected to both on-board electrical systems.

In addition, it is known in principle to design safety-relevant systems to be redundant overall. Each system is therefore embodied in a two-fold manner, wherein each of the systems is connected to a respective on-board electrical system.

In this connection, DE 10 2013 225 020 A1, for example, discloses an on-board electrical system having a basic on-board electrical system having at least one energy source. At least one load group is connected using loads that are present only once to the basic on-board electrical system for supplying electrical energy from the energy source by means of two channels, wherein each of the loads present only once is connected to the basic on-board electrical system for supplying electrical energy from the energy source by means of the two channels, wherein at least one further, redundant load group is connected using redundant loads to the basic on-board electrical system for supplying electrical energy from the energy source by means of the two channels, wherein each of the redundant loads is connected to the basic on-board electrical system for supplying electrical energy from the energy source by means of exactly one of the two channels.

DE 10 2013 221 578 A1 further discloses an electronic apparatus for a vehicle. The apparatus has a first voltage interface for connecting the apparatus to a first voltage supply for providing a first voltage, a second voltage interface for connecting the apparatus to a second voltage supply for providing a second voltage, a power element that can be operated using the second voltage, and a control circuit for controlling the power element. The apparatus further has a first coupling element and a second coupling element, which are each configured to permit a flow of current from an input to an output of the coupling elements and conversely to block said flow of current. The apparatus further has an isolating element having a first input and a first output galvanically decoupled from the first input, wherein the first input is connected to the outputs of the coupling elements. The apparatus further has a voltage converter, which is connected between the first output of the isolating element and a first supply voltage input of the control circuit.

SUMMARY

In an embodiment, the present invention provides a battery storage system, for supplying electrical power to at least one electrical vehicle function, which is redundantly connected to the battery storage system by a first supply branch and a second supply branch. The battery storage system includes a first connection and a second connection configured to connect to the first and the second supply branches; at least one ground connection; a connection line, which connects the first and the second connections; a cross-isolating switching apparatus arranged in the connection line and configured to interrupt the connection line; a first energy storage unit connected to the connection line between the first connection and the cross-isolating switching apparatus; and a second energy storage unit connected to the connection line between the second connection and the cross-isolating switching apparatus.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a battery storage system, an on-board electrical system having such a battery storage system, and a vehicle having such an on-board electrical system, which increase driving safety and provide a high degree of reliability in the electrical power supply, in particular safety-relevant control devices and functions.

According to an embodiment of the invention, a battery storage system is provided, in particular for a vehicle, for supplying electrical power to at least one electrical vehicle function, which is redundantly connected to the battery storage system by means of a first and a second supply branch, having a first and second connection for connection to the first and the second supply branch, and at least one ground connection, a connection line, which connects the first and the second connection, a cross-isolating switching apparatus, which is arranged in the connection line, in order to interrupt said connection line, a first energy storage unit, which is connected to the connection line between the first connection and the cross-isolating switching apparatus, and a second energy storage unit, which is connected to the connection line between the second connection and the cross-isolating switching apparatus.

According to an embodiment of the invention, an on-board electrical system is provided, in particular for a vehicle, for supplying electrical power to at least one electrical vehicle function, which is redundantly connected to the battery storage system by means of a first and a second supply branch, having an abovementioned battery storage system, wherein the first supply branch is connected to the first connection and the second supply branch is connected to the second connection, and the ground connection is connected to a ground of the on-board electrical system.

According to an embodiment of the invention, a vehicle having such an on-board electrical system is provided.

Embodiments of the present invention provide for a battery storage system with two separate energy storage units, in order, on the one hand, to permit separate operation of the supply branches connected to the connections using in each case one of the energy storage units, and, on the other hand, to be able to supply the two supply branches redundantly with electrical energy. In the event of a fault in one of the supply branches, the respective other supply branch can therefore continue to be operated. The at least one electrical vehicle function, for example an electrical steering system, an electrical brake, or another system, can accordingly continue to be operated by means of the second supply branch when there is a disruption in the first supply branch, or vice versa. Using two energy storage units connected in parallel with the connection line also gives rise to redundancy with respect to the energy storage units so that, when one energy storage unit fails, at least the supply branch that is not supplied with power by said energy storage unit can continue to be supplied with power. The two supply branches can therefore be electrically isolated by way of the cross-isolating switching apparatus, which also gives rise to isolation of the fault in the corresponding supply branches and energy storage units, respectively.

The electrical vehicle function is preferably a safety-relevant vehicle function, with the result that safety requirements can be satisfied by the redundant supply by means of the two supply branches. In this case, the safety-relevant vehicle function can be realized by a single device, for example a control device, which is redundantly connected to the two supply branches and, in the event of one supply branch failing, can be supplied with energy by means of the other supply branch. Alternatively, the electrical vehicle function can be realized, for example, by way of two independent devices, for example two control devices that provide the same function in a redundant manner. In this case, each of the individual devices is connected to another of the two supply branches. In the latter case, instead of a supply branch, one of the two redundant devices can fail without the electrical vehicle function being impaired.

The on-board electrical system is preferably a low-voltage network with 12 V. Alternatively, the on-board electrical system can also have a voltage deviating therefrom, of 24 V, 48 V or even higher or two supply branches are connected to one another by means of a voltage converter in such a way that said supply branches carry different voltages.

The energy storage units are preferably embodied as rechargeable energy storage units, preferably as battery stores.

In principle, the magnitude of the energy storage units can be selected as desired, wherein the energy storage units typically do not provide any energy for an electric drive. In principle, different capacitances and configurations for the energy storage units are conceivable, for example depending on the number of loads to be supplied with power in the vehicle and the electrical requirements thereof. The magnitude of the individual energy storage units is preferably selected depending on the total number of electrical loads and necessary powers, energy and dynamics in the respective supply branch. In principle, further energy storage units and/or supply branches can also be provided. The on-board electrical system and the battery storage system can be expanded in accordance with the same principles described here for increased redundancy using three parallel supply branches, for example.

In advantageous embodiments of the invention, the cross-isolating switching apparatus is embodied to have semiconductor switching elements. This permits rapid execution of switching processes in order to isolate the two supply branches in the event of a fault. As an alternative or in addition thereto, the cross-isolating switching apparatus comprises a contactor. Semiconductor switching elements permit rapid execution of switching processes and the contactor has proven itself as a switching element with a high degree of reliability. The cross-isolating switching apparatus particularly preferably comprises a series circuit of a contactor having at least one semiconductor switching element or a switching unit having a plurality of semiconductor switching elements.

In advantageous embodiments of the invention, the battery storage system has a first and/or a second isolating switch, which connects the first and the second energy storage unit, respectively, to the connection line. The first and/or second isolating switch ensures protection of the first and second energy storage unit, respectively, against overloading by virtue of the fact that the respective energy storage unit is electrically isolated. In the event of one energy storage unit failing, for example, the corresponding energy storage unit can therefore be isolated from the two supply branches. When the cross-isolating switching apparatus is closed, the two supply branches can therefore be jointly supplied with power by the respective other energy storage unit. In the event of a short circuit in one of the supply branches, the cross-isolating switching apparatus can be actuated first in order to electrically isolate the two supply branches. Moreover, the energy storage unit connected to the supply branch with the short circuit can be isolated by the isolating switch in order to prevent overloading. The isolating switch can have a contactor and/or a safety fuse and/or at least one semiconductor switching element. Semiconductor switching elements permit rapid execution of switching processes, the safety fuse affords protection against thermal overloading and the contactor has proven itself as a switching element with a high degree of reliability.

In advantageous embodiments of the invention, the battery storage system has a first and second ground connection, the battery storage system has a ground cross-connection, which connects the first and the second ground connection, the ground cross-connection is embodied to have a ground isolating switch in order to interrupt the ground cross-connection, the first energy storage unit is connected to the ground cross-connection between the first ground connection and the ground isolating switch, and the second energy storage unit is connected to the ground cross-connection between the second ground connection and the ground isolating switch. Currents over the ground connection that present a potential danger for the operation of the battery storage system can thus also be prevented. The ground isolating switch is preferably driven in parallel with the cross-isolating switching apparatus, with the result that the ground connection can also be isolated at the same time as the connection line. The ground isolating switch can be embodied to be integral with the cross-isolating switching apparatus, for example can be embodied as a two-pole switch, which acts both as part of the cross-isolating switching apparatus and as a ground isolating switch. In principle, the design of the ground isolating switch can be like the design of the cross-isolating switching apparatus.

In advantageous embodiments of the invention, the battery storage system comprises a battery management system. The battery management system can perform conventional tasks for monitoring the function of the two energy storage units by monitoring charge and discharge currents, for example. Furthermore, the battery management system can transfer energy between the two energy storage units in order to ensure maximum availability of the two supply branches. The battery management system can be embodied as a single battery management system for both energy storage units. As an alternative or in addition thereto, each of the energy storage units comprises an individual battery management system. The individual battery management systems of the two energy storage units are preferably jointly driven, either by one of the individual battery management systems of the two energy storage units undertaking said function as the master or by a superordinate battery management system at the level of the battery storage system. Synchronization is preferably effected using the battery management system for the purpose of isolating the supply branches by way of the cross-isolating switching apparatus. In this case, an energy store associated with the corresponding supply branch is also preferably isolated from the supply branch, for example by means of an isolating switch. The cross-isolating switching apparatus and the isolating switch are preferably actuated in a synchronized manner.

In advantageous embodiments of the invention, the battery storage system comprises a communication interface, for example CAN or FXR. The battery storage system can be connected to a central control unit of the vehicle by means of the communication interface in order to exchange information and to receive control commands. The communication interface is preferably embodied to provide additional information about the battery management systems of the first and second energy storage units.

In advantageous embodiments of the invention, the battery storage system is embodied as a modular assembly. The battery storage system can accordingly be assembled and, where necessary, replaced as a unit in a simple manner. On the other hand, individual components of the battery storage system can also be embodied in a modular manner. The modular assembly is preferably embodied to have a surrounding housing.

In advantageous embodiments of the invention, the battery storage system has a surrounding housing. The housing is preferably embodied as an insulating housing. The first and second connection and the at least one ground connection are preferably provided on the housing as connection terminals.

In advantageous embodiments of the invention, the battery storage system has a monitoring unit for monitoring the first and/or the second supply branch, and the monitoring unit is embodied to actuate the cross-isolating switching apparatus depending on the monitoring of the first and/or the second supply branch. The monitoring unit thus monitors the supply to the two supply branches in order to identify faults immediately. This involves the monitoring unit also monitoring the energy storage units in order to identify a fault arising there. In this case, the monitoring can be performed in detail using a battery management system of the respective energy storage unit, which, in the event of a fault, reports a fault to the monitoring unit. In principle, the monitoring unit can also be embodied and arranged separately from the battery storage system, for example as part of the on-board electrical system. The cross-isolating switching apparatus is actuated by the monitoring unit based on an identified fault.

In advantageous embodiments of the invention, the battery storage system is embodied to close the cross-isolating switching apparatus during normal operation and to temporarily open the cross-isolating switching apparatus in a diagnosis mode. It is not only the function of the cross-isolating switching apparatus itself that can be checked by way of the temporary actuation of the cross-isolating switching apparatus. In addition, the supply to the two supply branches can also be diagnosed thereby.

In advantageous embodiments of the invention, the first and the second energy storage unit are embodied as lithium-based energy storage units, in particular as LiFePo batteries. Lithium-based energy stores have already proven themselves for use in the vehicle sector on account of their weight and their storage capacity. LiFePo batteries concern batteries based on lithium iron phosphate with a cell voltage of 3.2 V or 3.3 V. The cathode material used is lithium iron phosphate (LiFePO4). The anode consists of graphite or hard carbon with embedded lithium. LiFePo batteries do not tend to experience thermal runaway in the case of mechanical damage, as a result of which the vehicle safety can be ensured in the event of an accident, for example.

Figure 1:
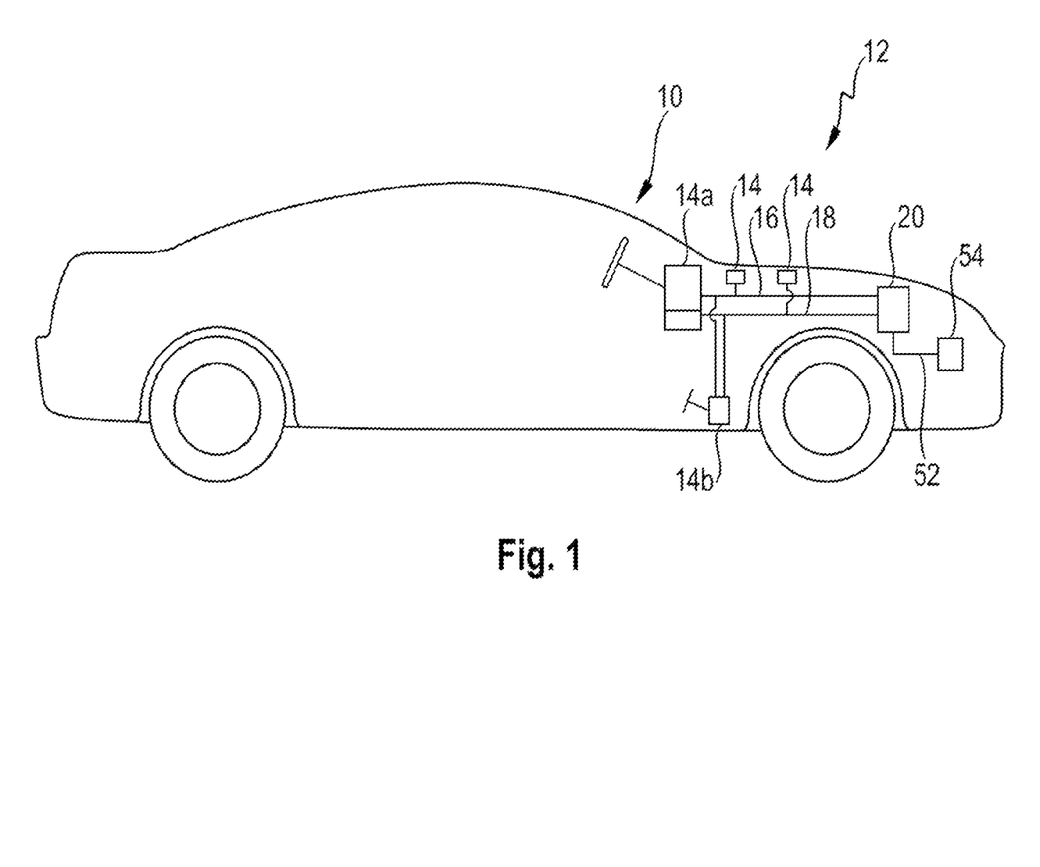
FIG. 1 shows a schematic illustration of a vehicle in accordance with a first, embodiment of the invention having an on-board electrical system having two redundant supply branches and a battery storage system.

FIG. 1 shows a vehicle 10 in accordance with a first embodiment of the invention. The vehicle 10 comprises an on-board electrical system 12 for supplying electrical power to a plurality of electrical vehicle functions 14. The on-board electrical system 12 is illustrated separately in FIG. 2. In this exemplary embodiment, the on-board electrical system 12 is a low-voltage network with a DC voltage of 12 V. Alternatively, the on-board electrical system 12 is embodied with a voltage of 24 V or 48 V. In the vehicle 10 of the first exemplary embodiment, the electrical vehicle functions 14 comprise an electrical steering system 14a and an electrical brake 14b. The electrical vehicle functions 14 are connected to a first and a second supply branch 16, 18. The first and second supply branch 16, 18 form a redundant supply for the electrical vehicle functions 14, that is to say that the vehicle functions 14 are connected in parallel with the two supply branches 16, 18 as a single device, for example a control device, as is illustrated in FIG. 1 for the brake 14b and the steering system 14a. Alternatively, the electrical vehicle functions 14 can each have two redundant electrical devices, for example control devices, which are supplied with power alternatively by means of one of the two supply branches 16, 18, respectively.

Figure 2:
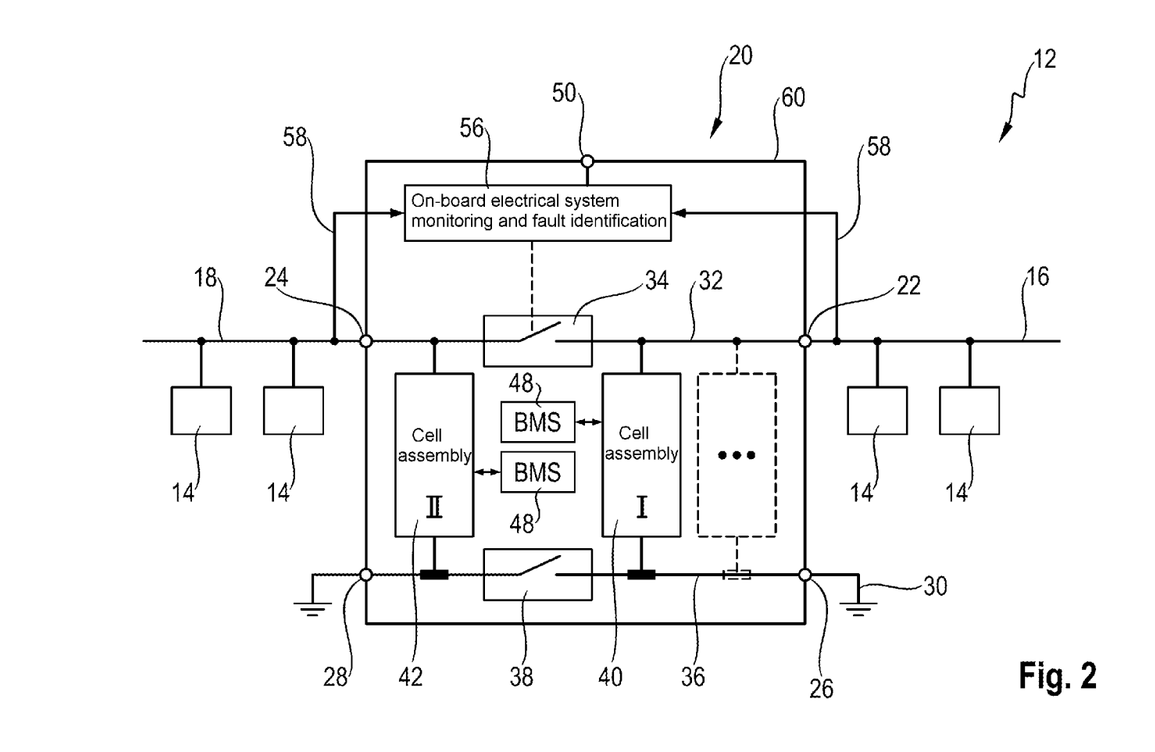
FIG. 2 shows a schematic illustration of the on-board electrical system of the vehicle in accordance with the first embodiment having two supply branches and a battery storage system.

The on-board electrical system 12 comprises a battery storage system 20. The battery storage system 20 comprises a first and second connection 22, 24, which are accordingly connected to the first and the second supply branch 16, 18. Moreover, the battery storage system 20 comprises a first and a second ground connection 26, 28, which are connected to a ground 30 of the on-board electrical system 12.

The battery storage system 20 further comprises a connection line 32, which connects the first and the second connection 22, 24, wherein a cross-isolating switching apparatus 34 is arranged in the connection line 32 in order to interrupt said connection line. In this exemplary embodiment, the cross-isolating switching apparatus 34 is embodied to have semiconductor switching elements and a contactor. The semiconductor switching elements in this case form a switching unit, which is arranged in series with the contactor.

The battery storage system 20 also comprises a ground cross-connection 36, which connects the first and the second ground connection 26, 28, The ground cross-connection 36 is in this case embodied with a ground isolating switch 38, which in principle is optional, in order to interrupt the ground cross-connection 36. The ground isolating switch 38 is embodied to have a series circuit composed of a switching unit having semiconductor switching elements and of a contactor, in accordance with the cross-isolating switching apparatus 34.

The battery storage system 20 comprises a first energy storage unit 40, which is connected to the connection line 32 between the first connection 22 and the cross-isolating switching apparatus 34 and to the ground cross-connection 36 between the first ground connection 26 and the ground isolating switch 38. The battery storage system 20 comprises a second energy storage unit 42, which is connected to the connection line 32 between the second connection 24 and the cross-isolating switching apparatus 34 and to the ground cross-connection 36 between the second ground connection 28 and the ground isolating switch 38. The first energy storage unit 40 and the second energy storage unit 42 are illustrated in detail in FIG. 3.

The first and second energy storage unit 40, 42 are embodied as rechargeable lithium-based energy storage units 40, 42. In this exemplary embodiment, the two energy storage units 40, 42 are specifically embodied as LiFePo batteries (lithium iron phosphate batteries). The two energy storage units 40, 42 respectively have the same number of individual cells 43 connected in series in order to supply the voltage of approximately 12 V. The first energy storage unit 40 has respectively two parallel individual cells and the second energy storage unit 42 has just one individual cell 43, as a result of which the first energy storage unit 40 can supply a higher current compared to the second energy storage unit 42. Details of the design of the first and second energy storage unit 40, 42 can be found in FIG. 3.

Figure 3:
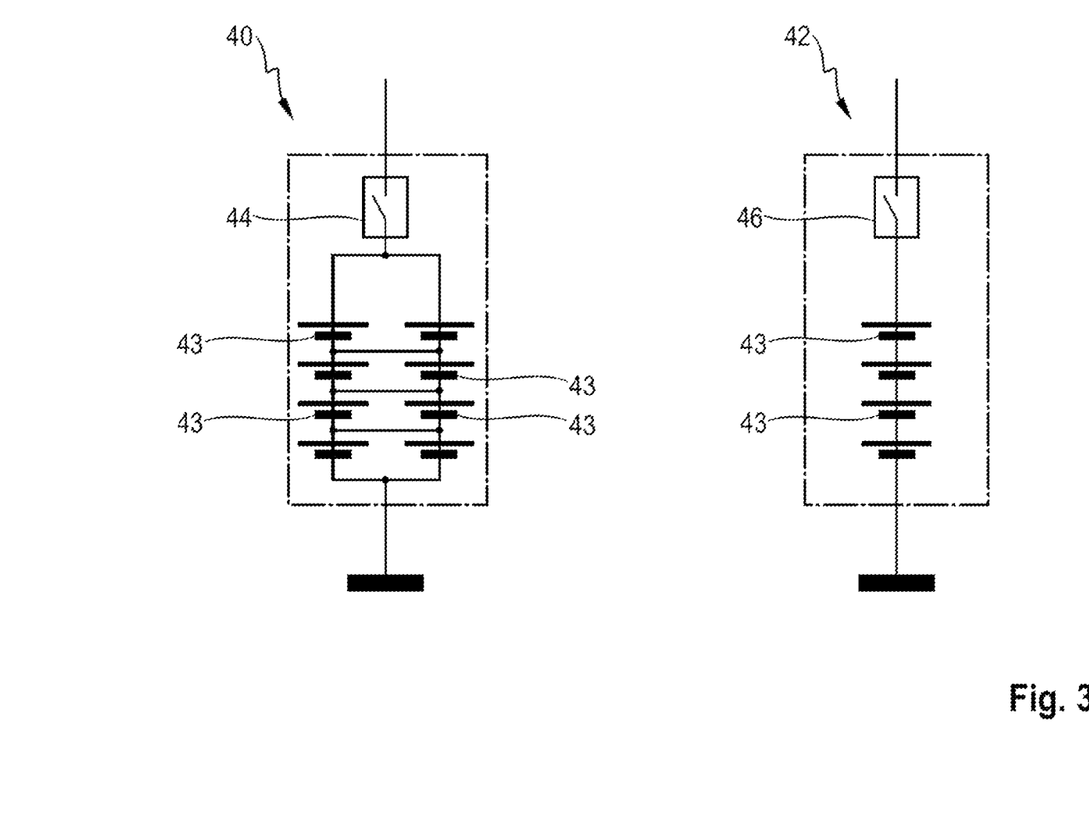
FIG. 3 shows a schematic illustration of a first and second energy storage unit of the battery storage system of the first embodiment.

The first and the second energy storage unit 40, 42 have in each case a first and second isolating switch 44, 46, respectively, by means of which the individual cells 43 are connected to the connection line 32 in a separable manner. The first and second isolating switch 44, 46, respectively, isolates the individual cells 43 of the respective energy storage unit 40, 42 from the connection line 32 upon actuation.

The battery storage system 20 also comprises two battery management systems 48 for monitoring the function of the two energy storage units 40, 42. Each of the two energy storage units 40, 42 is thus associated with a battery management system 48, which monitors the respective energy storage unit 40, 42 and actuates the associated isolating switch 44, 46 when required.

The battery storage system 20 additionally comprises a communication interface 50, which in this exemplary embodiment is embodied for connection to a CAN bus 52. The battery storage system 20 is connected to a central control unit 54 of the vehicle 10 by means of the communication interface 50 and the CAN bus 52. The communication interface 50 also provides information about the battery management systems 48 of the first and second energy storage units 40, 42.

The battery storage system 20 further has a monitoring unit 56 for monitoring the first and the second supply branch 16, 18. The monitoring unit 56 monitors the supply to the two supply branches 16, 18 in detail in order to identify faults immediately. For this purpose, the monitoring unit 56 is connected to the first and second supply branch 16, 18 in each case using a measurement connection 58. Moreover, the monitoring unit 56 monitors the energy storage units 40, 42 by means of the battery management systems 48 in order to identify a fault arising there. The monitoring unit 56 is further embodied to actuate the cross-isolating switching apparatus 34 and the ground isolating switch 38 in parallel and at the same time depending on the monitoring of the first and the second supply branch 16, 18 in order to isolate the two supply branches 16, 18 using the corresponding energy storage units 40, 42. In the event of an identified fault, the energy storage unit 40, 42 of the faulty supply branch 16, 18 is also electrically isolated by means of the corresponding isolating switch 44, 46.

In an alternative embodiment, the monitoring unit 56 is embodied and arranged separately from the battery storage system 20 as part of the on-board electrical system 12.

The battery storage system 20 is embodied overall as a modular assembly. In addition, the first and second energy storage unit 40, 42 are also embodied in a modular manner in the battery storage system 20, with the result that said energy storage units are interchangeable.

The battery storage system 20 comprises a surrounding housing 60, which is embodied as an insulating housing. The first and second connection 22, 24 and the first and second ground connection 26, 28 are provided on the housing 60 as connection terminals. In an alternative refinement of the battery storage system 20 without a ground isolating switch 38, just one connection terminal is provided on the housing 60 as a common ground connection.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A battery storage system, for supplying electrical power to at least one electrical vehicle function, which is redundantly connected to the battery storage system by a first supply branch and a second supply branch, the battery storage system comprising:
a first connection configured to connect to the first supply branch and a second connection configured to connect to the second supply branch;
a connection line that connects the first and the second connections;
a cross-isolating switching apparatus arranged in the connection line and configured to interrupt the connection line;
a first ground connection and a second ground connection;
a ground cross-connection line that connects the first and the second ground connections;
a ground isolating switch arranged in the ground cross-connection line and configured to interrupt the ground cross-connection;
a first energy storage unit connected to (i) the connection line between the first connection and the cross-isolating switching apparatus and (ii) the ground cross-connection line between the first ground connection and the ground isolating switch;
a second energy storage unit connected to (i) the connection line between the second connection and the cross-isolating switching apparatus and (ii) the ground cross-connection line between the second ground connection and the ground isolating switch; and
a surrounding housing, the surrounding housing being an insulating housing that includes therein the connection line, the ground cross-connection line, the first energy storage unit, and the second energy storage unit,
wherein the first and second connections and the first and second ground connections are provided on the insulating housing as connection terminals.

2. The battery storage system as claimed in claim 1, further comprising:
a first isolating switch that connects the first energy storage unit to the connection line; and
a second isolating switch that connects the second energy storage unit to the connection line.

3. The battery storage system as claimed in claim 2, wherein the first isolating switch includes a contactor and/or a safety fuse and/or a semiconductor switching component; and/or
wherein the second isolating switch includes a contactor and/or a safety fuse and/or a semiconductor switching component.

4. The battery storage system as claimed in claim 1, wherein the battery storage system is a modular assembly.

5. The battery storage system as claimed in claim 1, further comprising a monitoring unit disposed within the surrounding housing, the monitoring unit being configured to monitor the first supply branch and the second supply branch, wherein the monitoring unit is configured to actuate the cross-isolating switching apparatus in response to detection of a fault in the first supply branch or in the second supply branch.

6. The battery storage system as claimed in claim 5, further comprising a first battery management system configured to monitor the first energy storage unit and a second battery management system configured to monitor the second energy storage unit.

7. The battery storage system as claimed in claim 5, wherein the monitoring unit is configured to drive the cross-isolating switching apparatus and the ground-isolating switch in parallel so as to simultaneously isolate the connection line and the ground cross-connection line.

8. The battery storage system as claimed in claim 7, wherein the cross-isolating switching apparatus and the ground-isolating switch are components of a two-pole switch.

9. The battery storage system according to claim 5, wherein the monitoring unit is configured to monitor the first supply branch via a first measurement connection passing through the surrounding housing and connected to the first supply branch, and wherein the monitoring unit is configured to monitor the second supply branch via a second measurement connection passing through the surrounding housing and connected to the second supply branch.

10. The battery storage system according to claim 9, further comprising a first battery management system disposed within the surrounding housing and configured to monitor the first energy storage unit and a second battery management system disposed within the surrounding housing and configured to monitor the second energy storage unit, wherein the monitoring unit is configured to detect, via the first battery management system and the second battery management system, a fault arising in the first energy storage unit and/or the second energy storage unit.

11. The battery storage unit according to claim 10, further comprising:
a first isolating switch that connects the first energy storage unit to the connection line; and
a second isolating switch that connects the second energy storage unit to the connection line.

12. The battery storage unit according to claim 11, wherein the monitoring unit is configured to open the first isolating switch in response to detecting a fault arising in the first energy storage unit, and wherein the monitoring unit is configured to open the second isolating switch in response to detecting a fault arising in the second energy storage unit.

13. The battery storage system as claimed in claim 1, wherein the battery storage system is configured to close the cross-isolating switching apparatus during normal operation and to temporarily open the cross-isolating switching apparatus in a diagnosis mode.

14. The battery storage system as claimed in claim 1, wherein the first and the second energy storage units are lithium-based energy storage units.

15. The battery storage system as claimed in claim 1, wherein the cross-isolating switching apparatus comprises one or more semiconductor switching components and/or a contactor, and/or
   wherein the ground-isolating switch comprises one or more semiconductor switching components and/or a contactor.

16. The battery storage system as claimed in claim 1, wherein the cross-isolating switching apparatus comprises a series circuit of a contactor and one or more semiconductor switching components.

17. The battery storage system as claimed in claim 1, wherein the cross-isolating switching apparatus and the ground-isolating switch are components of a two-pole switch.

18. The battery storage system as claimed in claim 1, wherein the first and the second energy storage units are lithium iron phosphate batteries.

19. An on-board electrical system for supplying electrical power to at least one electrical vehicle function, which is redundantly connected to a battery storage system by a first and a second supply branch, the on-board electrical system comprising:
   the battery storage system, comprising:
      a first connection configured to connect to the first supply branch and a second connection configured to connect to the second supply branch,
      a connection line that connects the first and the second connections,
      a cross-isolating switching apparatus arranged in the connection line and configured to interrupt the connection line,
      a first ground connection and a second ground connection;
      a ground cross-connection line that connects the first and the second ground connections;
      a ground isolating switch arranged in the ground cross-connection line and configured to interrupt the ground cross-connection;
      a first energy storage unit connected to (i) the connection line between the first connection and the cross-isolating switching apparatus and (ii) the ground cross-connection line between the first ground connection and the ground isolating switch,
      a second energy storage unit connected to (i) the connection line between the second connection and the cross-isolating switching apparatus and (ii) the ground cross-connection line between the second ground connection and the ground isolating switch, and
      a surrounding housing, the surrounding housing being an insulating housing that includes therein the connection line, the ground cross-connection line, the first energy storage unit, and the second energy storage unit,
   wherein the first and second connections and the first and second ground connections are provided on the insulating housing as connection terminals,
   wherein the first supply branch is connected to the first connection and the second supply branch is connected to the second connection,
   wherein the ground connection is connected to a ground of the on-board electrical system, and
   wherein the battery storage system is a modular assembly defined by the surrounding housing and is configured to be interchangeable with an additional battery storage system.

20. A vehicle comprising:
   an on-board electrical system for supplying electrical power to at least one electrical vehicle function, which is redundantly connected to the battery storage system by a first and a second supply branch, the on-board electrical system comprising:
   a battery storage system, comprising:
      a first connection configured to connect to the first supply branch and a second connection configured to connect to the second supply branch,
      a connection line that connects the first and the second connections,
      a cross-isolating switching apparatus arranged in the connection line and configured to interrupt the connection line,
      a first ground connection and a second ground connection;
      a ground cross-connection line that connects the first and the second ground connections;
      a ground isolating switch arranged in the ground cross-connection line and configured to interrupt the ground cross-connection;
      a first energy storage unit connected to (i) the connection line between the first connection and the cross-isolating switching apparatus and (ii) the ground cross-connection line between the first ground connection and the ground isolating switch, and
      a second energy storage unit connected to (i) the connection line between the second connection and the cross-isolating switching apparatus and (ii) the ground cross-connection line between the second ground connection and the ground isolating switch, and
      a surrounding housing, the surrounding housing being an insulating housing that includes therein the connection line, the ground cross-connection line, the first energy storage unit, and the second energy storage unit,
   wherein the first and second connections and the first and second ground connections are provided on the insulating housing as connection terminals,
   wherein the first supply branch is connected to the first connection and the second supply branch is connected to the second connection, and
   wherein the ground connection is connected to a ground of the on-board electrical system.

* * * * *